June 1, 1943.  W. H. MANNING  2,320,878
BRAKE
Filed Jan. 29, 1942  2 Sheets-Sheet 1

Inventor
William H. Manning
By Blackmore, Spencer & Hint
Attorney

June 1, 1943. W. H. MANNING 2,320,878
BRAKE
Filed Jan. 29, 1942 2 Sheets-Sheet 2
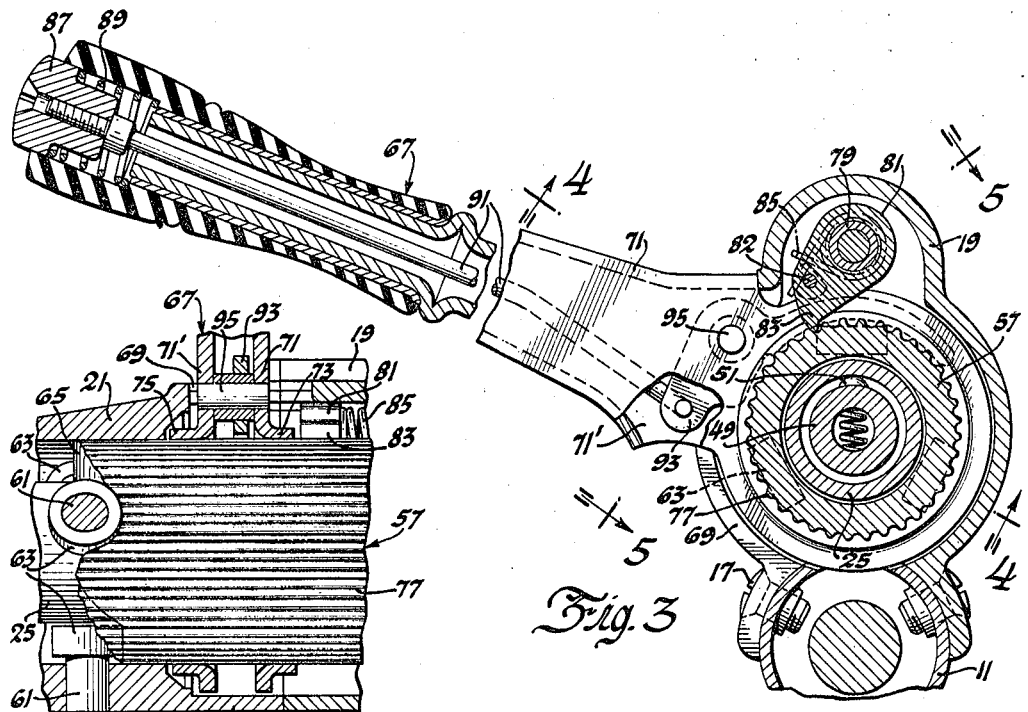
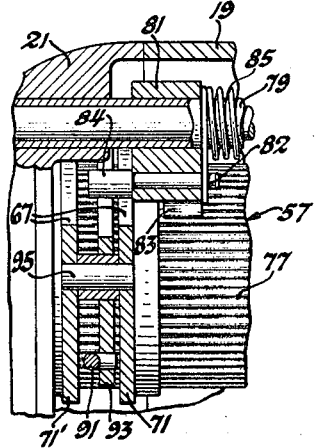
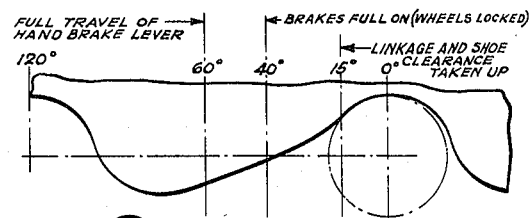
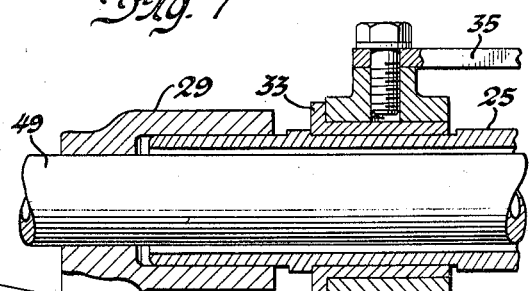
Inventor
William H. Manning
By
Blackmore, Spencer & Flint
Attorneys Patented June 1, 1943

2,320,878

UNITED STATES PATENT OFFICE 2,320,878

BRAKE

William H. Manning, Birmingham, Mich., assignor to General Motors Corporation, Detroit, Mich., a corporation of Delaware Application January 29, 1942, Serial No. 428,753

6 Claims. (Cl. 74—485)

This invention relates to brakes and has been designed for use on vehicles.

The invention has for its object a form of applying means located just beneath the hand steering wheel.

As another object the mechanism is so arranged that the clearance in the brake is taken up by a relatively limited angular movement of the brake lever after which the actual pressure is effected by the rotation of the lever through a longer arc thereby affording a more advantageous leverage.

Other objects will be understood from the description which follows.

On the drawings:

Figure 3 is a section on line 3—3 of Figure 2.

Figure 4 is a section on line 4—4 of Figure 3.

Figure 5 is a section on line 5—5 of Figure 3.

Figure 6 is a longitudinal section of the parts of the brake operating mechanism adjacent the lower part of the steering column.

Figure 7 is an explanatory diagram.

Figure 1:
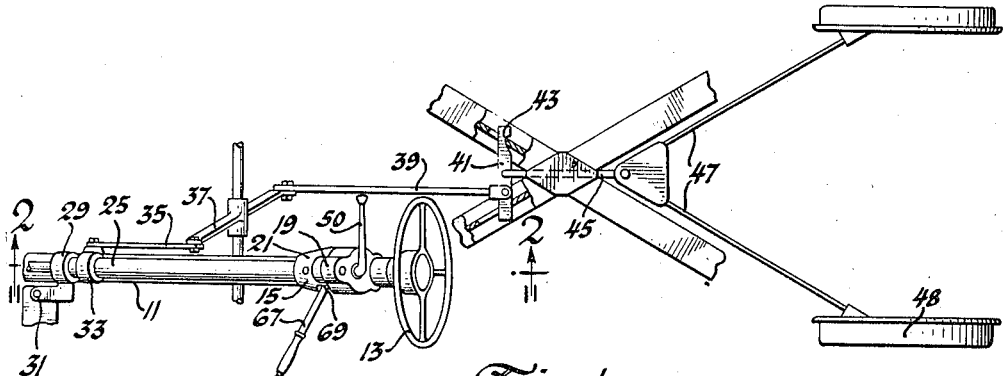
Figure 1 is a top plan view.
Figure 2:
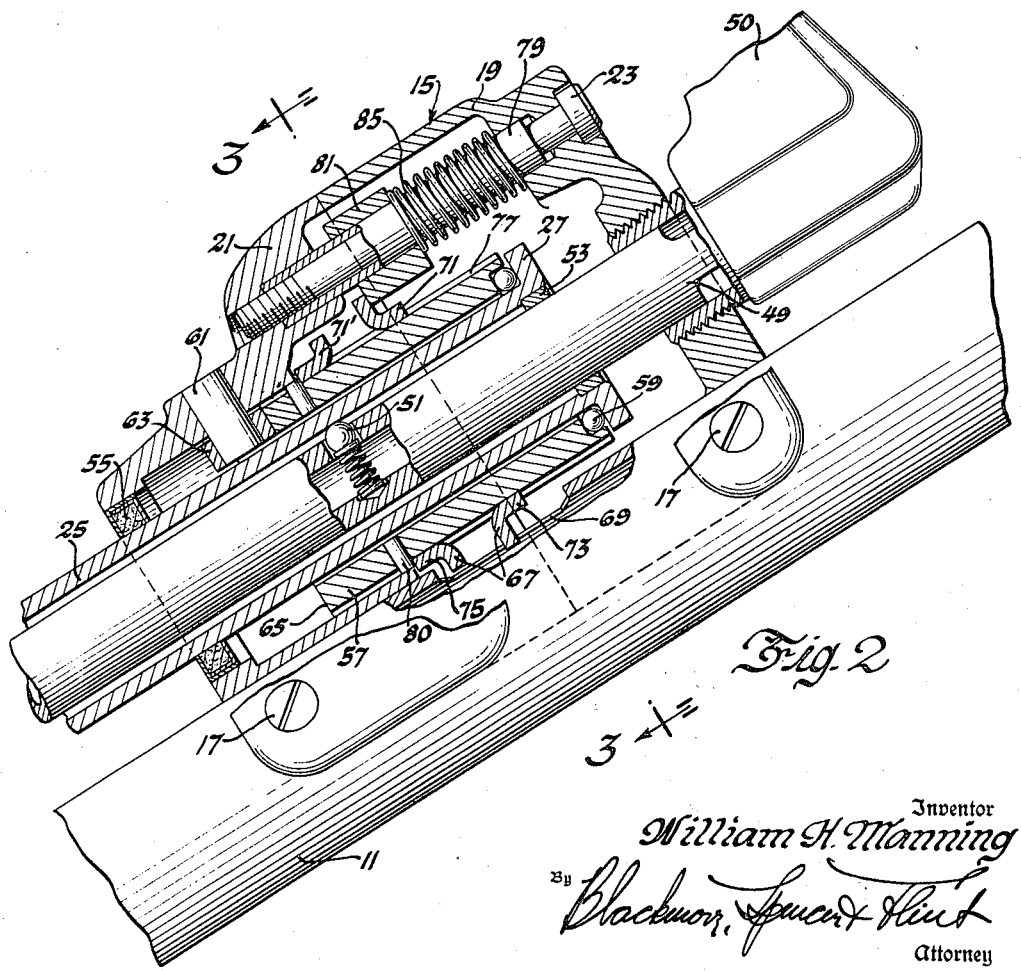
Figure 2 is a section on line 2—2 of Figure 1.

Referring by reference characters to the drawings, numeral 11 is used to designate the steering column at the top of which is the conventional steering wheel 13. Numeral 15 is a housing attached to the steering column just beneath the steering wheel, the fastening means being seen at 17. This housing 15 is formed from two hollow members 19 and 21 secured together by fastening means 23. A tubular shaft 25 extends in parallel relation to the steering column and into the housing. At its upper end within the housing the shaft 25 has a radially extending flange 27.

Secured at 31 to any convenient rigid part of the vehicle adjacent the lower part of the steering column is a supporting bracket 29. Within a recess of the bracket is slidably supported the lower end of shaft 25. To this lower end of shaft 25 is secured a collar 33 from which extends a link 35 pivotally attached to one end of a lever 37. A link 39 connects the other end of the lever 37 to a second lever 41 fulcrumed to the frame at 43. A link 45 extends from lever 41 and is terminally connected to divergent links 47 which operate any preferred or conventional brakes (not shown) but housed within drums 48 associated with wheels, not shown. It will now be appreciated that vertical reciprocation of shaft 25 serves to apply the brakes through the instrumentality of the linkage just described.

Not a part of this invention but illustrated is a shaft 49 extending through shaft 25. This shaft is associated with suitable connections, not shown, for shifting clutches and gears to effect driving ratios in the vehicle transmission. This shaft 49 is actuated by a lever 50 which the drawing shows only in a conventional way. A convenient number of spring pressed balls, one being shown at 51, serve to provide antifriction means between shafts 49 and 25. Bushings 53 and 55 are also provided to guide the member 25 in its reciprocating movements.

Part 57 is a sleeve within the housing 15 and surrounding the shaft 25. A circular series of steel balls 59 are placed between one end of the sleeve 57 and the flange 27 of shaft 25. Numeral 61 represents pins of which there are three distributed in a circular series. They are carried by the housing member 21 and project radially within the housing where they carry rollers 63 which engage cam faces 65 on the end of the sleeve.

A manually operable emergency brake lever is marked 67. It projects through an opening 69 in housing 15. It has spaced end portions 71, 71' from which project flanges 73, 75 seated in channels or axial serrations 77 formed on the outer face of sleeve 57. By this means rotary movement of lever 67 is transmitted to sleeve 57. Surrounding fastening means 23 is a sleeve 79. Rotatable and slidable on this sleeve is a pawl 81 having a tooth 83 to engage the serrations of sleeve 57. Numeral 85 represents a combined compression coil and torsion spring surrounding sleeve 79. One end is in abutment with a part of housing member 19 and thus serves to press the pawl against the lever part 71. In consequence lever part 73—75 is pressed against pins 80 extending outwardly from sleeve 57. By this means contact is maintained between the cam surfaces of the sleeve 57 and the rollers 63. The end of the spring 85 extends radially and engages a pin 82 carried by the pawl, its resiliency serving to hold the pawl tooth 83 within the serrations. Axially slidable within the end of hand lever 67 and projecting therefrom is a push button 87 normally projected outwardly by a spring 89 housed within the hand gripping end of the lever. A rod 91 extends through the lever and connects button 87 with one arm of a lever 93 pivoted at 95 to the parts 71, 71' of lever 67. The other arm of lever 93 is adapted to engage an extension 84 of pin 82 and lift the tooth of the pawl from the serrations when the button 87 is depressed in a way which needs no explanation.

In the operation of the brake the lever 67 is rotated carrying with it sleeve 57. Rotation of sleeve 57 causes it to reciprocate owing to the cam surfaces and roller formation. This reciprocation effects the reciprocation of shaft 25 through the instrumentality of balls 59 and flange 27. The cam surface at the end of the sleeve is so formed that for the first 15 degrees of lever rotation the steep cam for each roller moves the sleeve to a considerable extent, enough to take up clearance in the brake mechanism. Thereafter the cam slope is less steep and for the subsequent degrees of rotation the lever functions to move the sleeve but little, but acts to exert the needed force to effect progressively greater frictional retardation. In other words, a comparatively limited rotation of the lever takes up clearance and the greater part of its movement is available to create frictional resistance. It will be understood that the figures given and illustrated in Fig. 7 are illustrative only and that the varying mechanical advantage may be changed by changes in the cam outline.

It will be evident that as the sleeve 57 is reciprocated the lever moves along with the sleeve because of the contact of pins 80 with the lever. In consequence the pawl 81, also moved axially because of its contact with the lever, presses spring 85 and creates the resilient energy for the return of the parts to brake release position. In any position of lever adjustment the spring pressed pawl holds the lever and the brakes are thus held applied. Release is effected by depression of the button 87.

I claim:

1. In brake applying means a sleeve, mechanism to rotate said sleeve about its axis, first means to reciprocate said sleeve in response to its rotation and other means actuated by said sleeve reciprocation to apply a brake, together with pawl means reciprocable jointly with said sleeve and yielding means to resist reciprocation of said pawl and to press said pawl into locking engagement with the said sleeve.

2. In brake applying means a sleeve, mechanism to rotate said sleeve about its axis, first means to reciprocate said sleeve in response to its rotation and other means actuated by said sleeve reciprocation to apply a brake, together with pawl means to hold said sleeve in positions of adjustment, pin means carried by said sleeve and engaging said mechanism, said pawl also engaging said mechanism, and yielding means to hold said pawl locked to said sleeve and adapted to be potentially energized by the joint reciprocation of said sleeve, mechanism and pawl.

3. In combination, a fixed housing, a reciprocable shaft extending into said housing, a sleeve surrounding said shaft, mechanism to rotate said sleeve, first means acting in response to said rotation to effect reciprocation of said sleeve, cooperating parts on said sleeve and shaft whereby reciprocation of the sleeve effects reciprocation of said shaft and connections operably related to said shaft to effect brake application, said first means comprising a plurality of rollers distributed on a circular series and cam surfaces on the end of said sleeve cooperating with said rollers to vary the mechanical advantage whereby a lesser mechanical advantage is provided for taking up clearance and a greater mechanical advantage is available for exerting braking force.

4. An assembly of parts operable with a changing mechanical advantage to do work comprising a reciprocable shaft, a sleeve surrounding said shaft, mechanism to rotate said sleeve, cam means operable in response to sleeve rotation to reciprocate said sleeve at changeable rates, a pawl, said pawl, mechanism and sleeve having engaging parts whereby they reciprocate together, said pawl having a fixed axis of rotation whereby it may engage said sleeve in any position of reciprocation to hold said sleeve from reverse reciprocation, release means operably associated with said mechanism to move said pawl from engagement with said sleeve and spring means operable to hold said pawl against said mechanism.

5. In combination, a housing, a shaft extending into said housing, a sleeve surrounding said shaft, mechanism to rotate said sleeve, said sleeve having cam formations at one end, means held in position by said housing and engaging said cam formation to reciprocate said sleeve in response to sleeve rotation, cooperating parts on said sleeve and shaft whereby the latter is reciprocated, a second shaft parallel to said first mentioned shaft, a pawl slidable bodily on and rotatable about said second shaft, spring means to hold said pawl against said mechanism and to rotate said pawl into engagement with said sleeve, pin means carried by said sleeve adapted to engage said mechanism and pawl release means carried by said mechanism.

6. The invention defined by claim 5, together with the steering column of a vehicle, means to secure said housing to said column and linkage connected to said first mentioned shaft whereby its reciprocation may apply vehicle brakes.

WILLIAM H. MANNING.